(12) United States Patent
Nakai

(10) Patent No.: US 7,389,376 B2
(45) Date of Patent: Jun. 17, 2008

(54) HDD CONTROLLER AND SYSTEM EQUIPPED WITH THE SAME

(75) Inventor: Yoshiyuki Nakai, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 66 days.

(21) Appl. No.: 11/476,946

(22) Filed: Jun. 26, 2006

(65) Prior Publication Data

US 2007/0005856 A1    Jan. 4, 2007

(30) Foreign Application Priority Data

Jun. 29, 2005    (JP) ............................. 2005-189200

(51) Int. Cl.
G06F 13/20    (2006.01)
G06F 13/36    (2006.01)
G06F 13/38    (2006.01)
(52) U.S. Cl. ..................................... 710/313; 710/315
(58) Field of Classification Search .................. 710/313
See application file for complete search history.

(56) References Cited

U.S. PATENT DOCUMENTS 5,922,062 A * 7/1999 Evoy .......................... 710/305
6,401,142 B1 * 6/2002 Williams et al. ............... 710/14
6,950,897 B2 * 9/2005 Hensley et al. ............. 710/305
2002/0174351 A1 * 11/2002 Jeong et al. ................. 713/189

FOREIGN PATENT DOCUMENTS

JP    08-235111    9/1996
JP    09-134326    5/1997

* cited by examiner

Primary Examiner—Paul R. Myers
Assistant Examiner—Ryan M Stiglic
(74) Attorney, Agent, or Firm—Edwards Angell Palmer & Dodge LLP; David G. Conlin; William J. Daley, Jr.

(57) ABSTRACT

An HDD controller executes high-speed burst data transfer, at which the HDD controller has a master mode for the HDD controller to work as a bus master of a PCI bus, and a slave mode for the HDD controller to work as a slave unit to the PCI bus. When a PCI device connected to a memory for data exchange is slower than the HDD controller in slave access, the HDD controller operates in the slave mode in data control while the PCI device A becomes the bus master. On the other hand, when the PCI device is a PCI device B which is faster than or as fast as the HDD controller in slave access, the HDD controller operates in the master mode in data control.

12 Claims, 5 Drawing Sheets

FIG. 4

<PCI CONFIGURATION AREA LIST>

| OFFSET | ←BIT31 | REGISTER NAME | | BIT0→ |
|---|---|---|---|---|
| 00H | DEVICE ID | | VENDOR ID | |
| 04H | STATUS | | COMMAND | |
| 08H | CLASS CODE | | | REVISION ID |
| 0CH | BIST | HEADER TYPE | LATENCY TIMER | CACHE LINE SIZE |
| 10H | ATA COMMAND REGISTER BASE ADDRESS | | | |
| 14H | ATA CONTROL REGISTER BASE ADDRESS | | | |
| 18H | BUS MASTER CONTROL REGISTER BASE ADDRESS | | | |
| 1CH | PCI SLAVE MODE BASE ADDRESS | | | |
| 20H | | | | |
| 24H \| 28H | RESERVE | | | |
| 2CH | SUB SYSTEM ID | | SUB SYSTEM REVISION | |
| 30H \| 38H | RESERVE | | | |
| 3CH | MAX LATENCY | MIN GRANT | INTERRUPT PIN | INTERRUPT LINE |
| 40H \| 42H | ⋮ | | | |
| 44H | IDE RESET | | | |
| 48H | PIO TIMING | | | |
| 4CH | ULTRADMA TIMING1 | | | |
| 50H | ULTRADMA TIMING2 | | | |
| 54H | PIO CONTROL | | | |
| 58H | IDE BUS MASTER CONTROL | | | |
| 5CH | DEVICE STATUS | | | |
| 60H~ FCH | RESERVE | | | |

HDD CONTROLLER AND SYSTEM EQUIPPED WITH THE SAME

This non-provisional application claims priority under 35 U.S.C. §119(a) on Patent Application No. 2005-189200 filed in JAPAN on Jun. 29, 2005, the entire contents of which are hereby incorporated herein by reference.

FIELD OF THE INVENTION

The present invention relates to an HDD (Hard Disk Drive) controller and a system equipped with the same, and more particularly, to an HDD controller that controls data transfer between PCI (Peripheral Component Interconnect) devices on a PCI bus and an HDD, as well as to a system that is equipped with the HDD controller and a plurality of other PCI devices than the HDD controller and that allows access between the HDD controller and the PCI devices.

BACKGROUND OF THE INVENTION

PCI buses have been in common use to serve as system buses that give connection between devices in personnel computers (PC), various types of electronic equipment, or the like. Such system buses are employed in order to build a system architecture that does not depend on a higher data transfer rate or a high-performance processor.

A PCI bus carries out every data transfer in a principle of block transfer, which is realized in a process of burst transfer. This allows the PCI bus to yield a maximum data transfer rate of 133 megabyte per second (MBps) (when the bus has a data transfer capacity of 32 bits). The PCI bus is specified to support both memories and I/O address spaces for burst transfer.

When a system includes a processor or a bus master that creates data bursts in an I/O address space, I/O data bursts created by the processor or bus master enable even faster data transfer between I/O devices and between system memories and the I/O devices, which leads to improved system performance.

As a conventional technique to offer faster data transfer, such a computer system is suggested (for example, see Japanese Patent No. 3579149) that is devised in a try to increase the speed of a process of access to a known I/O-mapped I/O device, the process being executed by a CPU or a bus master other than the CPU via a PCI bus.

The computer system disclosed in Japanese Patent No. 3579149 includes a means for designating I/O devices, which are assigned to a given I/O address on a PCI bus, as a memory space and generating a memory cycle in response to a request for I/O access to the I/O devices, and a means for turning the memory cycle into a series of I/O cycles for access to the I/O devices.

The system described in Japanese Patent No. 3579149 allows a CPU to function as a bus master and provide access to the I/O devices, but is incapable of showing sufficient bus performance in access to a high-speed I/O device because of the memory cycle generated in response to the I/O access request. Specifically, according to the system described in Japanese Patent No. 3579149, data access to the I/O devices and to memories are switched via a bridge circuit, and the CPU does not have to interfere at least with data transfer in memory access but has to interfere with every data transfer involving burst transfer. This makes it impossible for the system to carry out data transfer to the high-speed I/O device under sufficient bus performance.

The technique according to the system described in Japanese Patent No. 3579149 is characterized by the CPU working as a bus master to provide access to a specific I/O device, which may be an HDD. The HDD is controlled by an HDD controller, which works as a bus master to control data transfer involving access to the HDD. In this data transfer process, bus performance becomes insufficient when a targeted PCI device other than the HDD controller in the data transfer is a device performing slowly in slave access (target access).

For example, such a case can be assumed that the HDD controller is connected to a PCI device A other than the HDD, the device A being slow in target access, via a bus. When the PCI device A is a data transfer target and the HDD controller makes access to the PCI device A slow in target access, a process to be carried out is the one as shown in the left-half of a timing chart (e.g. transfer of 8 bursts of data) exhibited in FIG. 3. The chart demonstrates that the PCI device A, slow to process target access, causes the HDD controller to wait by sending out a TRDY signal from a PCI hF (Interface) on the PCI device A. In this case, therefore, an efficient transfer process is not executed.

The above case applies not only to the technique according to the Japanese Patent No. 3579149, but also to techniques in popular use. In many cases, due to features in system designing the system can include specific combination of circuits, another PCI device connected to an HDD controller that can be a device slow in slave access, or an HDD controller may be connected to an IC (Integrated Circuit) chip having a PCI device slow in slave access.

One reason for slow data transfer in a slave access process is that, for a certain type of PCI device, a PCI device carries out such a process that it stops a PCI bus immediately after receiving data from the PCI device to write the data into a local memory, and asks for data on the PCI bus again after finishing writing. Meanwhile, the PCI bus works on faster data transfer through a burst transfer process of sending out an address first and data in succession. Upon receiving data, the PCI bus brings together, for example, 32 bursts of data for burst transfer to increase process speed, for example, in writing the data into a page memory. In speeding up data transfer, an improvement in repeated stoppage of and data request to the PCI bus may be one approach to take, but, in principle, PCI bus controllers are not designed for high-speed performance, which makes such improvement difficult to achieve.

SUMMARY OF THE INVENTION

The object of the present invention is to execute burst data transfer with an advantage of the maximum bus performance even in data access between a PCI device slow in target access and an HDD under control by an HDD controller in a system equipped with the HDD controller when the system includes both the PCI device slower than the HDD controller in target access and a PCI device faster than or as fast as the HDD controller in target access.

The object of the present invention is to provide an HDD controller controlling a process of transferring data between one or a plurality of PCI devices on a PCI bus and an HDD on an I/O bus conforming to an ATA standard, the HDD controller comprising a master mode for the HDD controller to work as a bus master of the PCI bus upon executing high-speed burst transfer of the data; and a slave mode for the HDD controller to work as a slave unit to the PCI bus upon executing high-speed burst transfer of the data.

Another object of the present invention is to provide an HDD controller, comprising a switching portion for performing switchover between the master mode and the slave mode.

Another object of the present invention is to provide an HDD controller, wherein the HDD controller controls data transfer in the slave mode when the PCI device is a device slower than the HDD controller in slave access, while controls data transfer in the master mode when the PCI device is a device faster than or as fast as the HDD controller in slave access.

Another object of the present invention is to provide an HDD controller, wherein two PCI devices are connected to the PCI bus, the two PCI devices consisting of a PCI device slower than the HDD controller in slave access and a PCI device faster than or as fast as the HDD controller in slave access, wherein the HDD controller has an encrypting portion that encrypts and decrypts data when the data is read from and written into the HDD, and wherein the HDD controller provides different encryption for a case of data control by the HDD controller in the master mode and for a case of data control by the HDD controller in the slave mode, respectively.

Another object of the present invention is to provide an HDD controller, wherein the HDD controller reads data stored as burst data in a specific address designated by the HDD controller and writes the data into the HDD when the HDD controller is in the slave mode.

Another object of the present invention is to provide an HDD controller, wherein a second HDD is connected to the HDD controller in addition to the HDD, and wherein when the HDD controller is controlled in the master mode, one of the PCI devices makes slave access to the second HDD.

Another object of the present invention is to provide a system equipped with the HDD controller, wherein a PCI device slower than the HDD controller in slave access and another PCI device faster than or as fast as the HDD controller in slave access are connected to the PCI bus, and wherein the HDD controller works as a bus master of the PCI bus to the another PCI device faster than or as fast as the HDD controller in slave access upon executing high-speed burst data transfer to the another PCI device, while works as a slave unit of the PCI bus to the PCI device slower than the HDD controller in slave access upon executing high-speed burst data transfer to the PCI device.

BRIEF DESCRIPTION OF THE DRAWINGS

FIG. 4 is a diagram showing one example of a configuration register in a PCI I/F of a HDD controller according to another embodiment of the present invention.

PREFERRED EMBODIMENTS OF THE INVENTION

Figure 1:
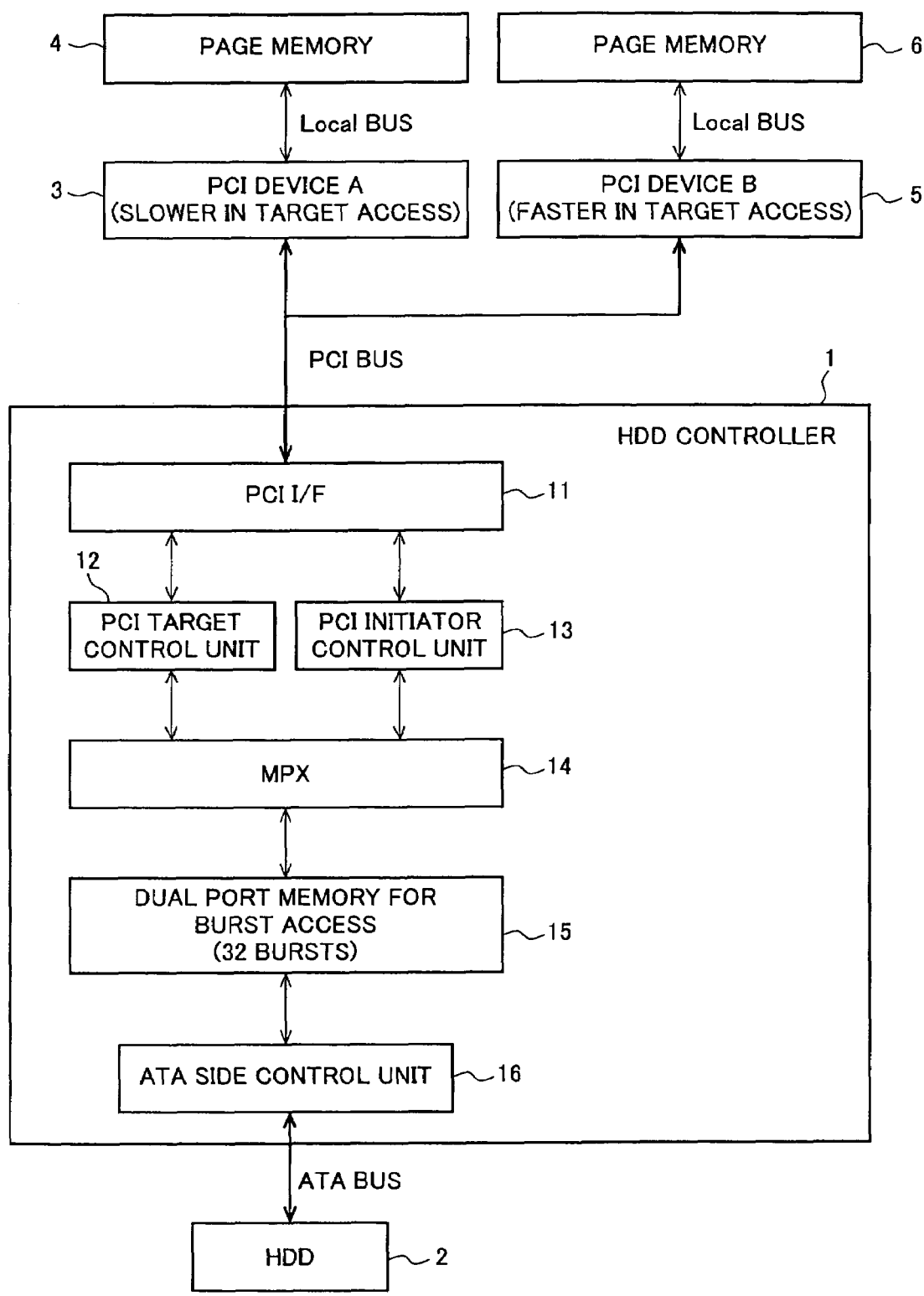
FIG. 1 is a block diagram showing one example of the configuration of a system equipped with an HDD controller and PCI devices connected to the HDD controller according to one embodiment of the present invention.

FIG. 1 is a block diagram showing one example of the configuration of a system equipped with an HDD controller and PCI devices connected to the HDD controller according to one embodiment of the present invention. In FIG. 1, symbol 1 stands for an HDD controller, 2 for an HDD, 3 for a PCI device A, 4 for a page memory of the PCI device A (3), 5 for a PCI device B, 6 for a page memory of the PCI device B (5), 11 for a PCI I/F, 12 for a PCI target control unit, 13 for a PCI initiator control unit, 14 for a multiplexer (MPX) 15 for a dual port memory for burst access, and 16 for an ATA (At attachment) side control unit.

The system according to one embodiment of the present invention (hereinafter referred to as the present system) includes the HDD controller 1 of the present invention, to which the HDD 2 is connected via an I/O bus (ATA bus) conforming to the ATA standard (IDE (Integrated Drive Electronics) standard), and the PCI devices A (3), B (5) that are PCI devices different from PCI devices consisting of the HDD 2 and the HDD controller 1, and that are on a PCI bus. ATA represents an industrial standard for buses, and includes the ATA-2 standard and the ATAPI standard. The present invention is applicable to ATA standard equipment.

The HDD controller 1 controls data transfer between one or a plurality of PCI devices (PCI devices A, B) on the PCI bus and the HDD 2 on the ATA bus. That is, the HDD controller 1 transfers data on the PCI bus to the HDD 2 on the ATA bus, and does vise versa (input/output). The data transfer control mainly includes a process of writing data from the PCI devices on the PCI bus into the HDD 2, a process of reading data out of the HDD 2 into the PCI devices, and a switchover process between a master mode and a slave mode according to the present invention.

The PCI device A (3) is a memory device capable of writing/reading data in and out of the page memory 4 connected to the PCI device A (3) via a local bus. Likewise, the PCI device B (5) is a memory device capable of writing/reading data in and out of the page memory 6 connected to the PCI device B (5) via a local bus. The present invention is described on the assumption that the PCI device A (3) is slower than the HDD controller 1 in slave access, while the PCI device B (5) is faster than or as fast as the HDD controller 1 in slave access. Though no illustration is given in FIG. 1, the PCI devices A (3), B (5) are equipped with PCI controllers having PCI I/Fs, respectively.

The PCI device A (3), for example, may be an ASIC (Application-specific IC) for use in image processing, and the PCI device B (5), for example, may be a system ASIC according to the present system. The system according to this embodiment may be an image processor, such as a multifunction compound machine, that is capable of writing data from a memory, such as the page memory (page memory 4 or 6) on the PCI bus, into the HDD 2, or may be a system that carries out encrypting and decrypting (with a possible data erasing function) in writing in or reading out data, which will be described later.

The HDD controller 1 according to the present invention has a master mode and a slave mode upon executing high-speed burst data transfer (e.g. DMA (Direct Memory Access) transfer), that is, upon operating in a high-speed burst transfer mode. In the master mode, the HDD controller 1 works as a bus master of the PCI bus. In the slave mode, the HDD controller 1 works as a slave unit to the PCI bus.

Adoption of the master or slave mode depends on whether a PCI device connected to a data exchange target memory is faster or slower than the HDD controller 1 in slave access. If the PCI device is slower one, the HDD controller 1 controls data transfer in the slave mode. If the PCI device is faster or as fast as the HDD controller 1, the controller 1 controls data transfer in the master mode.

The ATA standard includes the ATA 100 standard enabling data transfer at a maximum transfer rate of 100 MBps, and other standards of ATA 66, ATA 133 by the same definition. The ATA 100 standard and the ATA-133 standard offer a data transfer mode for driving an HDD at high speed, and that for driving the same at low speed. For example, the ATA 133 offers a data transfer mode for driving an HDD at a high speed of 133 Mbps, and that for driving the same at a speed lower than the high speed. In imitation of the selection of data transfer modes according to the ATA standard, adoption of the master or slave mode by the HDD controller 1 may be decided in such a way that the slave access rate of a target PCI device in the present data transfer mode is compared to the slave access rate of the HDD controller 1 before the adoption of either master or slave mode is decided.

Preferably, the HDD controller 1 has a means for switchover between the master mode and the slave mode. Performing as such a means, for example, a CPU on the PCI bus makes a register setting to cause the HDD controller 1 to function usually as the bus master, and makes a setting that will be described later referring to FIG. 4 when causing the HDD controller 1 to operate in the slave mode. Specifically, a PCI slave mode base address (hereinafter referred to as slave address) is designated in the HDD controller 1, where data assigned and sent to the slave address by a PCI device other than the HDD controller 1 (PCI device A (3)) is processed mainly by the PCI target control unit 12.

This allows the HDD controller 1 to function as the bus master (initiator) to enable high-speed data transfer to the HDD 2 when local memory data (data in the page memory 6) on a memory controller permitting high-speed target burst access via the PCI hiasis transferred to the HDD 2, and allows a memory controller (PCI device A(3)) incapable of permitting high-speed target burst access via the PCI bus to function as the bus master to enable efficient data transfer when local memory data (data in the page memory 4) on the memory controller is transferred to the HDD 2.

The HDD controller 1 comprises the PCI I/F 11, the PCI target control unit 12, the PCI initiator control unit 13, the multiplexer (MPX) 14 for input selection, the dual port memory 15 for burst access, and the ATA (At attachment) side control unit 16. The PCI I/F 11 is an interface including a unit administrative information table (configuration register), which will be described later referring to FIG. 4.

The PCI initiator control unit 13 controls the process to execute when the HDD controller 1 works as the bus master of the PCI bus, and, according to this embodiment, also controls the PCI device B (5) that is a data transfer target. The PCI initiator control unit 13 generates a frame signal that indicates whether or not data is output to the dual port memory 15 via the MPX 14, and sends the signal to the dual port memory 15 and to PCI devices other than the HDD controller 1 (PCI devices A, B) on the PCI bus. The frame signal is, therefore, a signal that indicates whether or not data transfer is in progress, so that the PCI initiator control unit 13 sends out the frame signal to secure the PCI bus until the negation of the PCI bus.

The PCI initiator control unit 13, as it presents the frame signal, specifies the first head address and transfers given bursts (e.g. 32 bursts) of data in series to carry out multiplex processing of the address and data. At the end of serial transfer of the 32 bursts of data, the PCI initiator control unit 13 negates the frame signal. The number of burst, which means how many times a piece of data is transferred in series, is fixed as indicated in this embodiment. The number of burst 32, therefore, means that 32 times of data transfer (32 long words transfer) in series for one address.

The PCI initiator control unit 13 sends a Read address to the dual port memory 15 when a data transfer process is reading data out of the dual port memory 15, and sends a Write address to the dual port memory 15 when a data transfer process is writing data into the dual port memory 15, via the MPX 14. The PCI initiator control unit 13, therefore, transfers data to the ATA side control unit 16, using the dual port memory 15 for burst access, in executing a reading/writing process, so that the ATA side control unit 16 reads or writes data from and in the HDD 2 in control over the ATA bus. In controlling data transfer to the outside of the HDD controller 1, the PCI initiator control unit 13 controls the external PCI devices A (3), B (5) via the PCI I/F 11 and the PCI bus.

The PCI target control unit 12 controls data transfer when the HDD controller 1 works as a slave unit (target) to the PCI bus, that is, in this embodiment, the PCI target control unit takes control when PCI device A(3) is the bus master. When the HDD controller 1 becomes the slave unit, the PCI target control unit 12 receives a frame signal input from a PCI device other than the HDD controller 1 (PCI device A) on the PCI bus. This frame signal, for example, indicates whether data input is in progress or not for data transferred from the PCI device A(3) to the PCI target control unit 12.

The PCI target control unit 12 sends a Read address to the dual port memory 15 when a data transfer process is reading data out of the dual port memory 15, and sends a Write address to the dual port memory 15 when a data transfer process is writing data into the dual port memory 15, via the MPX 14.

The MPX 14 selects input from either the PCI target control unit 12 or the PCI initiator control unit 13, and outputs a selected command and data from either unit. Selection may be merely directly outputting a command and data from either unit sending input.

The dual port memory 15 for burst access is a readable/writable buffer memory for burst transfer adapted to a dual port, and is considered in the following description to be a memory requiring a memory capacity for 32 bursts of data. The dual port memory 15 is capable of data reading/writing on the page memory 4 connected through the bus to the PCI device A (3) and on the page memory 6 connected through the bus to the PCI device B (5), via the PCI target control unit 12 and the PCI initiator control unit 13, and is capable of data reading/writing on the HDD 2 via the ATA side control unit 16.

With the dual port memory 15, the HDD controller 1 writes data from the PCI into the dual port memory 15, reads out the data, and then writes the data into the HDD 2 when writes the data from the PCI into the HDD 2. In the reverse data transfer, the HDD controller 1 writes data from the HDD 2 into the dual port memory 15, reads out the data, and then writes the data into other memories on the PCI bus (page memories 4, 6, etc.).

The ATA side control unit 16 is a unit to control data exchange between the HDD controller 1 and the HDD 2. The ATA side control unit 16 controls data transfer in such a way that a given number of burst of data (i.e., given number of PCI burst, which is 32 bursts in this embodiment) are transferred between the HDD 2 and the dual port memory 15. The ATA side control unit 16 sends a Read address to the dual port memory 15 when a data transfer process is reading data out of the dual port memory 15, and sends a Write address to the dual port memory 15 when a data transfer process is writing data into the dual port memory 15.

The present system requires at least one PCI device other than the HDD controller 1 to be connected to the PCI bus as the HDD controller 1 is. In this case, the system decides automatically, depending on the target access rate as will be described later, on whether the HDD controller 1 works as a bus master or a slave unit in carrying out data exchange with the PCI device, and executes burst data transfer based on the decision. Even if the HDD controller 1 is connected to 3 or more PCI devices, the system also decides automatically on whether a targeted PCI device or the HDD controller 1 works as the bus master or the slave unit to the PCI bus, and executes burst data transfer based on the decision.

Figure 2:
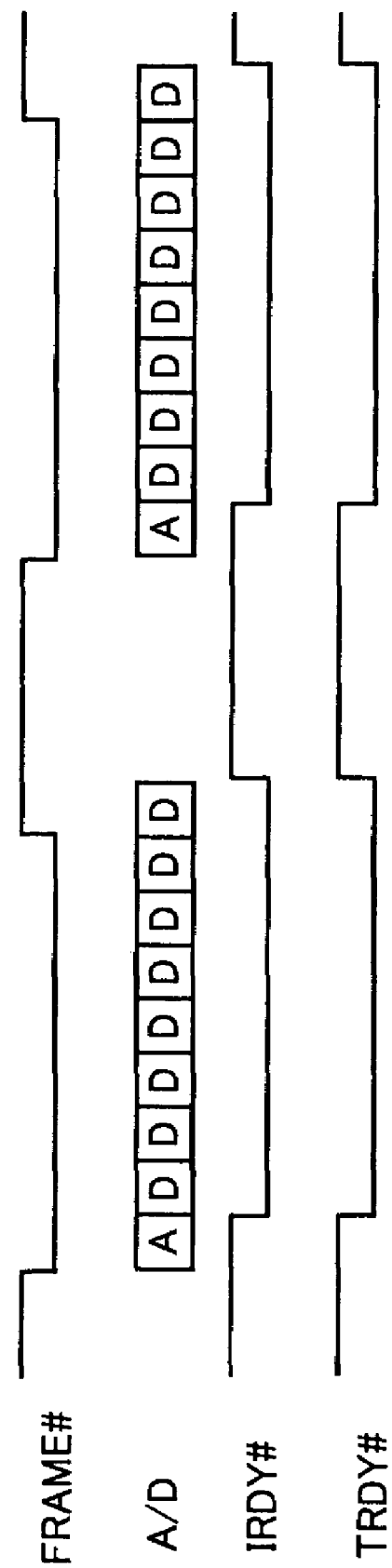
FIG. 2 is a timing chart that results when data transfer to the PCI devices A, B is executed in series in the system shown in FIG. 1.
Figure 3:
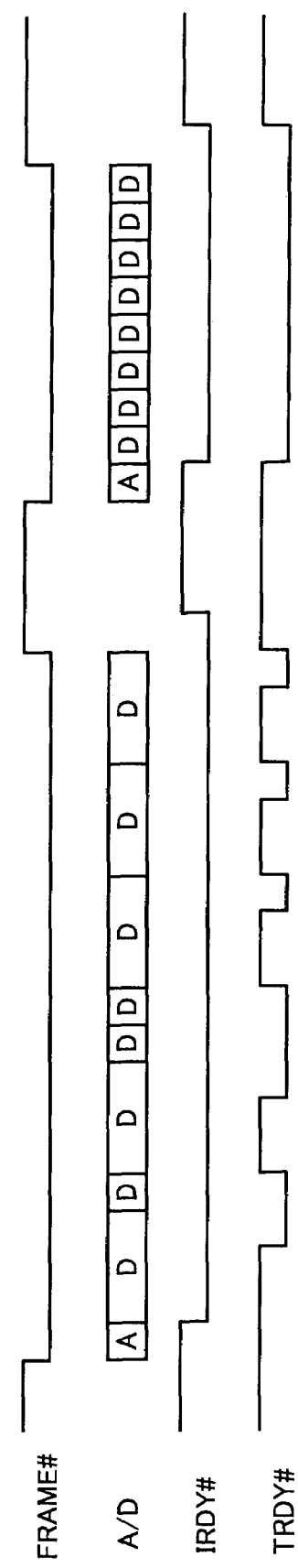
FIG. 3 is a timing chart that results when the same data transfer as indicated in FIG. 2 is executed using a conventional HDD controller.

FIG. 2 shows a timing chart resulting when data transfer to the PCI devices A, B is executed in series in the system shown in FIG. 1. FIG. 3 shows a timing chart resulting when the same data transfer as indicated in FIG. 2 is executed using a conventional HDD controller. With respect to FIG. 3, the conventional HDD controller means a controller that works as a bus master when executes data transfer related to access to an HDD connected to the HDD controller itself.

Due to space limitations, FIGS. 2, 3 exhibit the timing charts that result from an assumption of 8 burst data transfer, and a description of the charts, therefore, is to be made for a case of 8 burst data transfer. The timing charts shown in FIGS. 2, 3 indicate results in a case where data is transferred to the PCI device A, and then to the PCI device B. It will be appreciated that the charts cannot show the order, volume, and direction of data transfer in various cases, and that the charts may represent only the data from one PCI device. Nevertheless, the processes and units pertaining to the present invention are the same in different cases, for which no further explanation is given.

In FIGS. 2, 3, FRAME# signal represents a signal to indicate whether data transfer is in progress or not (i.e. signal to indicate the start and end of a bus cycle) A represents an address signal, D represents a data signal, IRDY# represents a signal to indicate that a bus master (initiator) is ready for data input/output, and TRDY# represents a signal to indicate that a target is ready for data input/output. A PCI device (or the HDD controller 1) functioning as the bus master puts the FRAME# signal into an assertive state when a need for data transfer arises. The PCI I/F of the PCI device starts burst data transfer while the IRDY# signal is in the assertive state, and waits data transfer while the TRDY# signal is negated.

The right half of the timing chart shown in FIG. 2 represents a case where the HDD controller 1 becomes the bus master (initiator) and transfers data to the PCI device B(5) functioning as a data transfer target. In this case, the TRDY# signal and FRAME# signal are sent from the PCI I/F of the PCI device B(5), and the IRDY# signal is from the PCI I/F 11 of the HDD controller 1. The signals in a state of Low indicate that the bus master and target are ready for data input/output. The TRDY# signal is received by the PCI I/F 11 of the HDD controller 1, which retards the data transfer process when it receives a signal indicating that the target is not ready. As shown in the chart, the TRDY# signal keeps staying in the Low state during data transfer, which demonstrates that data transfer is carried out without a delay. In this case, therefore, data is transferred smoothly by an 8 burst transfer process because the PCI device B(5) is a device permitting high-speed target access.

The left half of FIG. 2 represents a timing chart resulting from a case where the PCI device A(3)becomes the bus master (initiator) and transfers data to the HDD controller 1 functioning as a data transfer target. In this case, the TRDY# signal and FRAME# signal are sent from the PCI I/F 11 of the HDD controller 1, and the IRDY# signal is from the PCI I/F of the PCI device A(3). The signals in a state of Low indicate the bus master and target are ready for data input/output. The TRDY# signal is received by the PCI I/F of the PCI device A(3), which retards the data transfer process when it receives a signal indicating that the target is not ready. As shown in the chart, the TRDY# signal keeps staying in the Low state during data transfer, which demonstrates that data transfer is carried out without a delay. In this case, therefore, data is also transferred smoothly by the 8 burst transfer process, which is realized by causing the HDD controller 1, faster in target access, to serve as the target while causing the PCI device A(3) to serve as the initiator, because of the PCI device A(3)'s slowness in target access.

The left half of FIG. 3 represents a timing chart resulting from a case where a conventional HDD controller becomes the bus master (initiator), as in a usual case, and transfers data to the PCI device A functioning as a data transfer target. In this case, the TRDY# signal and FRAME# signal are sent from the PCI I/F of the PCI device A, and the IRDY# signal is from the PCI I/F of the HDD controller. The signals in a state of Low indicate the bus master and target are ready for data input/output. The TRDY# signal is received by the PCI I/F of the HDD controller, which retards the data transfer process when it receives a signal indicating that the target is not ready. As shown in the chart, the TRDY# signal often comes into a state of High because of the PCI device A's slowness in target access, which demonstrates that data transfer is executed with a delay in this case.

The right half of FIG. 3 represents a timing resulting from a case where a conventional HDD controller works as the bus master and makes access to the PCI device B. In this case, different from the case as shown in the left half of FIG. 3, data transfer is carried out without a delay because the PCI device B is fast in target access.

Comparing the left half of FIG. 3 to that of FIG. 2 reveals that the HDD controller 1 of the present invention saves a transfer time equivalent in length to a time during which a conventional HDD controller stops data transfer. The HDD controller 1 of the present invention, therefore, is capable of executing efficient and high-speed data transfer. Working examples show that the HDD controller of the present invention is three times as fast as a conventional HDD controller in carrying out data transfer.

FIG. 4 is a diagram showing one example of a configuration register in a PCI I/F of a HDD controller according to another embodiment of the present invention. This register is the unit administrative information table of, for example, 256 bytes recorded in the PCI I/F 11 of the HDD controller 1 shown in FIG. 1.

According to another embodiment of the present invention, the HDD controller 1 is preferably caused to read data stored as burst data in a specific address designated by the HDD controller 1 and write the data into the HDD 2 when the HDD controller 1 is in the slave mode. In this embodiment, therefore, the HDD controller 1 has the mode for being the bus master to a PCI, and the mode for being a slave unit to a PCI as well in carrying out a high-speed burst data transfer mode of the HDD 2. In the slave mode to the PCI, the HDD controller 1 reads data stored as burst data in the specific address and writes the data into the HDD 2 in high-speed burst data transfer (UDMA (Ultra DMA) Mode). This embodiment is also applicable to encrypting/decrypting processes that will be described later.

In designating a specific address with respect to the HDD controller 1, according to this embodiment, the specific address is set in the register in the PCI I/F 11. This specific address is provided with a designated address space that is broader greatly than an I/O space of an ordinary I/O device and that serves as if it were a memory device. The address space permits storage of burst data. Specifically, according to this embodiment, although the HDD 2 belongs to an I/O device, the HDD 2 is treated as a piece of memory, and a counterpart device, working as the bus master, sends the specific address in DMA transfer, using a memory command. In this manner, the HDD controller 1 works as the slave unit to the PCI. The HDD controller 1 operating in the slave mode receives generated data through the designated address space.

FIG. 4 shows the register containing such specific addresses sets. This register permits setting of an offset address of PCI Slave Mode Base Address (hereinafter simply referred to as Slave Mode Address). This Slave Mode Address is to provide a set address space that is used when the HDD controller 1 is in the slave mode. As a result, the set address space is provided as a data transfer destination when a device other than the HDD controller 1 works as the bus master and executes DMA data transfer. Hence DMA data transfer to the HDD controller 1 is executed in this manner.

Meanwhile, a conventional HDD controller (or DMA controller) offers merely a narrow address space for an HDD that is an I/O device, thus is not available for DMA data transfer. Specifically, when such a HDD controller provides a fixed address offering an address space as wide as an ordinary I/O space capable of receiving up to 32 bursts of data, DMA data transfer becomes impossible. In this case, a CPU has to reads/writes data repeatedly, which slows down the whole process. On the other hand, according to this embodiment, such an address setting is made in the PCI I/F 11 that as if the dual port memory 15 had a page memory, so that DMA data transfer becomes possible.

According to still another embodiment of the present invention, another HDD (hereinafter referred to as second HDD) is connected to the HDD controller 1 in addition to the HDD 2. When the HDD controller 1 takes control in the master mode, one of the PCI devices makes slave access to the second HDD.

Connection of two HDDs to one HDD controller, as in the above case, permits two memory controllers to make access efficiently to the HDDs. High-speed burst data transfer to two HDDs can be carried out in such a way that as the HDD controller 1 working as the bus master exchanges data with one PCI device, the other PCI device makes slave access to the second HDD. This embodiment is also applicable to the encrypting/decrypting processes that will be described later. In the system where two HDDs are connected to one HDD controller and data to each HDD is encrypted and decrypted, a decision has to be made on whether to carry out encrypting/decrypting separately or not, on what mode to adopt in encrypting, and so forth for efficient processes. Setting of an encryption key or the like ensures efficient processes. Encrypting data to one HDD while decrypting data to the other HDD is a possible method to adopt.

Figure 5:
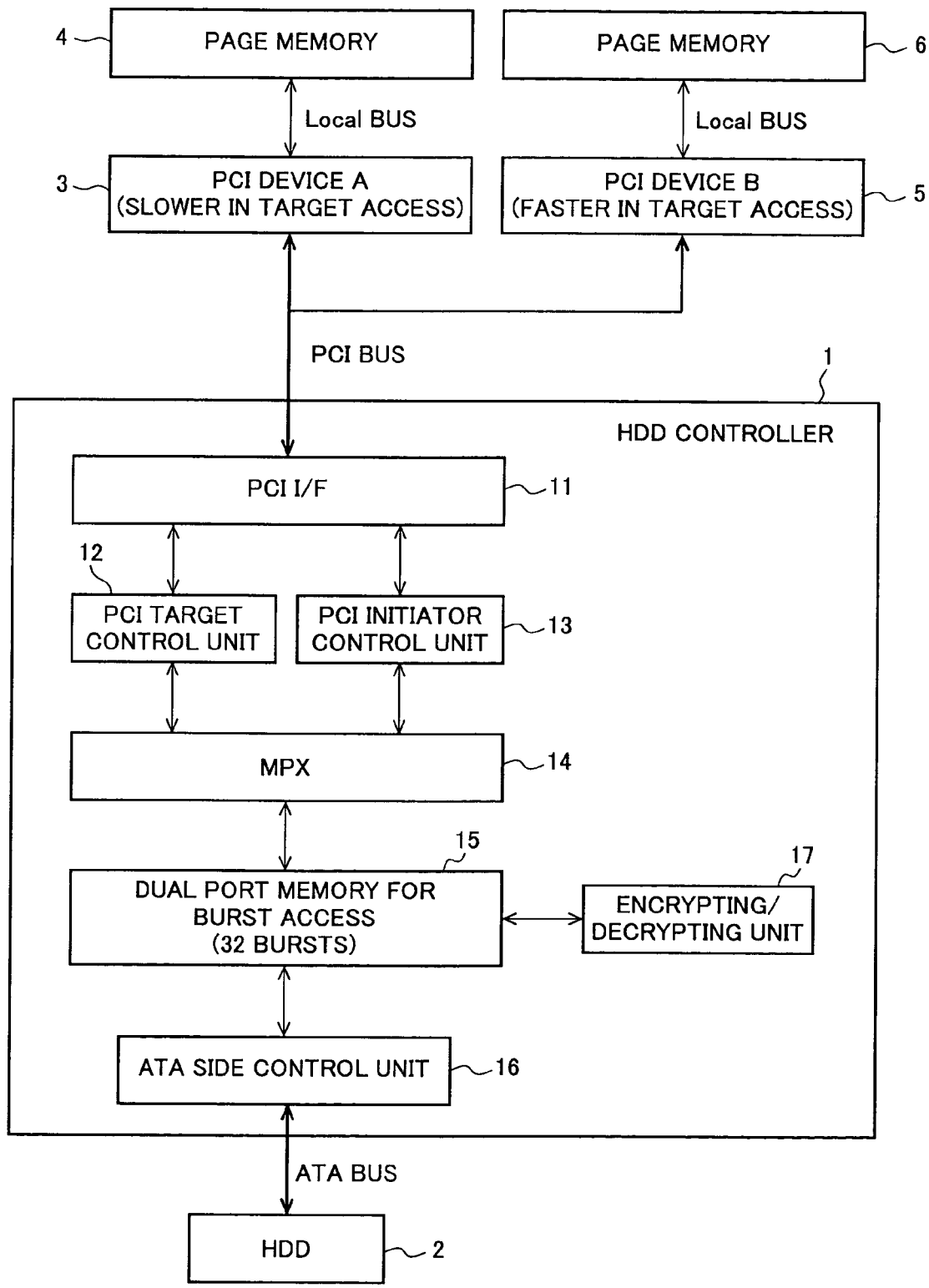
FIG. 5 is a block diagram showing one example of the configuration of a system equipped with an HDD controller according to still another embodiment of the present invention and with PCI devices connected to the HDD controller.

FIG. 5 is a block diagram showing one example of the configuration of a system equipped with an HDD controller according to still another embodiment of the present invention and with PCI devices connected to the HDD controller. In FIG. 5, a symbol 17 stands for an encrypting/decrypting unit.

According to the configuration example shown in FIG. 5, the HDD controller 1 is provided with the encrypting/decrypting unit 17 in addition to the other components depicted in FIG. 1. Each component has been described heretofore referring to FIGS. 1 to 4, so that no further description is given except for the encrypting/decrypting unit 17.

According to the embodiment indicated in FIG. 5, a PCI device slower in slave access and another PCI device faster than or as fast as the HDD controller 1 in slave access are connected to the PCI bus. The HDD controller 1 of this embodiment has an encryption means (the encrypting/decrypting unit 17) that encrypts and decrypts data when the data is read and written into the HDD 2. The encrypting/decrypting unit 17 functions as different encryption means for a case of data control by the HDD controller 1 in the master mode (for the PCI device faster in slave access) and for a case of data control by the HDD controller 1 in the slave mode (for the PCI device slower in slave access), respectively. The encrypting/decrypting unit 17, for example, may be made to execute encrypting/decrypting according to AES (Advanced Encryption Standard) when the HDD controller 1 is in the master mode, while made to execute encrypting/decrypting according to DES (Data Encryption Standard) when the HDD controller 1 is in the slave mode.

Actually, different encryption methods and/or encryption keys must be employed in encrypting data in the page memory 4 of the PCI device A (3) and data in the page memory 6 of the PCI device B (5) because both data are different in types from each other. Besides, when the data from the page memory 4 and that from the page memory 6 are written into the HDD 2 by a simultaneous process, the simultaneous process cannot be executed unless different encryption methods and/or encryption keys are employed. This holds true also for a decrypting process.

In such a case, a conventional system requires a CPU connected to the PCI bus to specify an encryption method and/or an encryption key by register setting every time processes for the PCI devices A, B are switched. On the other hand, the system according to this embodiment has a function of encrypting and decrypting data upon reading and writing the data into the HDD 2, allowing independent setting of an encryption key and/or an encryption method according to an individual case where a PCI is the master or a slave. This means that the system according to this embodiment enables high-speed data access to the HDD 2 accompanying encrypting/decrypting processes without letting the CPU interfere to slow down a data processing.

When the HDD controller 1 is connected to 3 or more PCI devices, the system decides automatically, as described before, on whether any one of PCI device or the HDD controller 1 works as the bus master or a slave unit to the PCI bus, and executes burst data transfer based on the decision. If such a system includes, for example, two PCI devices slower in target access, two devices are subjected to encrypting processes using different encryption means provided by a method different from that of the present invention, or to an encrypting process using the same encryption means.

The present invention enables execution of burst data transfer with an advantage of the maximum bus performance even in data exchange between a PCI device slow in target access and an HDD under control by an HDD controller in a system equipped with the HDD controller when the system includes both the PCI device slower in target access than the HDD controller and a PCI device faster than or as fast as the HDD controller in target access.

The invention claimed is:

1. An HDD controller controlling a process of transferring data between one or a plurality of PCI devices on a PCI bus and an HDD on an I/O bus conforming to an ATA standard, the HDD controller comprising:
   a master mode for the HDD controller to work as a bus master of the PCI bus when executing high-speed burst transfer of the data;
   a slave mode for the HDD controller to work as a slave unit to the PCI bus when executing high-speed burst transfer of the data; and
   wherein the HDD controller controls data transfer in the slave mode when the PCI device is a device slower in slave access than the HDD controller in slave access and controls data transfer in the master mode when the PCI device is a device faster than or as fast as the HDD controller in slave access.

2. The HDD controller of claim 1, further comprising a switching portion for performing switchover between the master mode and the slave mode.

3. The HDD controller of claim 1, wherein the HDD controller reads data stored as burst data in a specific address designated by the HDD controller and writes the data into the HDD when the HDD controller is in the slave mode.

4. The HDD controller of claim 1, wherein
   a second HDD is connected to the HDD controller in addition to the HDD, and wherein
   when the HDD controller is controlled in the master mode, one of the PCI devices makes slave access to the second HDD.

5. The HDD controller of claim 1, wherein the HDD controller is configured to operate in the slave mode responsive to a signal externally generated indicating that the PCI device is a device slower in slave access than the HDD controller in slave access.

6. An HDD controller controlling a process of transferring data between two or more PCI devices connected to a PCI bus and an HDD on an I/O bus conforming to an ATA standard, wherein the two or more PCI devices comprise a PCI device slower than the HDD controller in slave access and a PCI device faster than or as fast as the HDD controller in slave access, the HDD controller comprising:
   a master mode for the HDD controller to work as a bus master of the PCI bus upon executing high-speed burst transfer of the data;
   a slave mode for the HDD controller to work as a slave unit to the PCI bus upon executing high-speed burst transfer of the data;
   an encrypting portion that encrypts and decrypts data when the data is read from and written into the HDD; and wherein:
   the HDD controller controls data transfer in the slave mode when the PCI device is a device slower than the HDD controller in slave access and controls data transfer in the master mode when the PCI device is a device faster than or as fast as the HDD controller in slave access, and
   the HDD controller provides different encryption for a case of data control by the HDD controller in the master mode and for a case of data control by the HDD controller in the slave mode, respectively.

7. A system, comprising
   a HDD controller, the HDD controller for controlling a process of transferring data between one or a plurality of PCI devices on a PCI bus and an HDD on an I/O bus conforming to an ATA standard;
   wherein the HDD controller includes a master mode for the HDD controller to work as a bus master of the PCI bus and a slave mode for the HDD controller to work as a slave unit to the PCI bus;
   a PCI device slower than the HDD controller in slave access and another PCI device faster than or as fast as the HDD controller in slave access are connected to the PCI bus;
   wherein the HDD controller works as the bus master of the PCI bus to the another PCI device faster than or as fast as the HDD controller in slave access when executing high-speed burst data transfer between the another PCI device and the HDD controller, and works as the slave unit of the PCI bus to the PCI device slower than the HDD controller in slave access when executing high-speed burst data transfer between this PCI device and the HDD controller.

8. The system of claim 7, wherein the HDD controller further includes a switching portion for performing switchover between the master mode and the slave mode.

9. The system of claim 7, wherein the HDD controller reads data stored as burst data in a specific address designated by the HDD controller and writes the data into the HDD when the HDD controller is in the slave mode.

10. The system of claim 7, wherein
   a second HDD is connected to the HDD controller in addition to the HDD, and wherein
   when the HDD controller is controlled in the master mode, one of the PCI devices makes slave access to the second HDD.

11. The system of claim 7, wherein
   the HDD controller further includes an encrypting portion that encrypts and decrypts data when the data is read from and written into the HDD, and
   the HDD controller provides different encryption for a case of data control by the HDD controller in the master mode and for a case of data control by the HDD controller in the slave mode, respectively.

12. The system of claim 7, wherein the system further includes means for generating a signal to the HDD controller indicating that the PCI device is a device slower in slave access than the HDD controller in slave access and wherein the HDD controller is configured to operate in the slave mode responsive to the generated signal.

* * * * *